(12) United States Patent
Lemaire

(10) Patent No.: US 11,230,936 B2
(45) Date of Patent: Jan. 25, 2022

(54) RECTIFIER FOR AIRCRAFT TURBOMACHINE COMPRESSOR, COMPRISING AIR EXTRACTION OPENINGS HAVING A STRETCHED FORM IN THE PERIPHERAL DIRECTION

(71) Applicant: SAFRAN AIRCRAFT ENGINES, Paris (FR)

(72) Inventor: Clément Simon Martin Lemaire, Massy (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 130 days.

(21) Appl. No.: 16/079,143

(22) PCT Filed: Feb. 20, 2017

(86) PCT No.: PCT/FR2017/050374
§ 371 (c)(1),
(2) Date: Aug. 23, 2018

(87) PCT Pub. No.: WO2017/144805
PCT Pub. Date: Aug. 31, 2017

(65) Prior Publication Data
US 2019/0063243 A1 Feb. 28, 2019

(30) Foreign Application Priority Data

Feb. 24, 2016 (FR) .................................. 1651509

(51) Int. Cl.
*F01D 9/04* (2006.01)
*F01D 25/24* (2006.01)
*F02C 9/18* (2006.01)

(52) U.S. Cl.
CPC ............ *F01D 9/041* (2013.01); *F01D 25/246* (2013.01); *F02C 9/18* (2013.01); *F05D 2260/941* (2013.01); *Y02T 50/60* (2013.01)

(58) Field of Classification Search
CPC ........ F01D 9/041; F01D 9/042; F01D 25/246; F01D 25/243; F01D 5/225; F01D 9/04;
(Continued)

(56) References Cited

U.S. PATENT DOCUMENTS 2,698,711 A * 1/1955 Newcomb ........... F04D 27/0215
415/145
3,142,438 A * 7/1964 McKenzie .......... F04D 27/0215
415/190
(Continued)

FOREIGN PATENT DOCUMENTS

EP 1793088 A2 6/2007
FR 2929983 A1 10/2009
(Continued)

OTHER PUBLICATIONS

International Search Report for International Application No. PCT/FR2017/050374 dated Apr. 26, 2017.
(Continued)

*Primary Examiner* — Courtney D Heinle
*Assistant Examiner* — Andrew Thanh Bui
(74) *Attorney, Agent, or Firm* — Pearne & Gordon LLP

(57) ABSTRACT

The invention relates to a rectifier (1) for an aircraft turbomachine compressor, the rectifier comprising an inner ferrule (24), an outer ferrule (26), and stator blades (28) secured to the inner and outer ferrules, the rectifier also comprising a flange (34) secured to a downstream end of the outer ferrule (26) and designed to be fixed to a compressor housing (36), the flange being provided with air extraction openings (50) arranged at a distance from each other in a
(Continued)

peripheral direction (52). According to the invention, at least one of the air extraction openings (50) has a stretched form in the peripheral direction (52).

15 Claims, 5 Drawing Sheets

(58) Field of Classification Search
CPC . F01D 17/12; F05D 2260/941; F05D 2260/94
See application file for complete search history.

(56) References Cited

U.S. PATENT DOCUMENTS

| | | | | |
|---|---|---|---|---|
| 3,597,106 | A * | 8/1971 | Anderson | F04D 27/0215 |
| | | | | 415/144 |
| 4,187,054 | A * | 2/1980 | Landis, Jr. | F01D 5/18 |
| | | | | 415/115 |
| 6,782,702 | B2 * | 8/2004 | Charon | F02C 6/08 |
| | | | | 60/785 |
| 6,783,324 | B2 * | 8/2004 | Muny | F01D 25/246 |
| | | | | 415/144 |
| 8,152,460 | B2 * | 4/2012 | Brunet | F04D 29/545 |
| | | | | 415/201 |
| 9,523,286 | B2 * | 12/2016 | Waki | F04D 29/542 |
| 9,611,747 | B2 * | 4/2017 | Derclaye | F01D 9/041 |
| 9,869,328 | B2 * | 1/2018 | Edwards | F01D 25/246 |
| 2004/0191058 | A1 * | 9/2004 | Baumann | F01D 17/105 |
| | | | | 415/144 |
| 2011/0014028 | A1 * | 1/2011 | Wood | F01D 25/12 |
| | | | | 415/1 |
| 2014/0037429 | A1 * | 2/2014 | Okita | F01D 5/186 |
| | | | | 415/115 |
| 2016/0312631 | A1 * | 10/2016 | Bergman | F01D 9/06 |
| 2016/0312654 | A1 * | 10/2016 | Chakka | F01D 5/145 |

FOREIGN PATENT DOCUMENTS

| | | |
|---|---|---|
| FR | 2945331 A1 | 11/2010 |
| GB | 744548 A | 2/1956 |
| WO | 2009154517 A1 | 12/2009 |

OTHER PUBLICATIONS

Written Opinion for International Application No. PCT/FR2017/050374 dated Apr. 26, 2017.
French Search Report issued in Patent Application No. FR 16 51509 dated Oct. 21, 2016.

* cited by examiner

RECTIFIER FOR AIRCRAFT TURBOMACHINE COMPRESSOR, COMPRISING AIR EXTRACTION OPENINGS HAVING A STRETCHED FORM IN THE PERIPHERAL DIRECTION

This is a National Stage application of PCT international application PCT/FR2017/050374, filed on Feb. 20, 2017 entitled "RECTIFIER FOR AIRCRAFT TURBOMACHINE COMPRESSOR, COMPRISING AIR EXTRACTION OPENINGS HAVING A STRETCHED FORM IN THE PERIPHERAL DIRECTION", which claims the priority of French Patent Application No. 16 51509 filed Feb. 24, 2016, both of which are incorporated herein by reference in their entirety.

TECHNICAL FIELD

The present invention relates to an aircraft turbomachine, preferably of the turbojet or turboprop type.

More particularly, the invention relates to a compressor stator of the turbomachine, comprising an inner ferrule, an outer ferrule and stator vanes secured to the two ferrules.

PRIOR ART

Turbomachines are equipped with compressors made by the alternation of moving wheels and fixed wheels, the latter being commonly called "rectifiers". In addition to the stator vanes and the two ferrules, each rectifier comprises a flange integral with a downstream end of the outer ferrule, this flange being intended to be fixed on a compressor housing of the turbomachine.

Usually, the flange is traversed by air bleed ports spaced apart from each other in the circumferential direction of the rectifier. Thus, a small air flow can escape from the primary jet passing through the compressor, passing through the axial clearance between the rectifier and the moving wheel directly downstream. Then, the air flow taken can circulate through the bleed ports of the flange, then join other elements of the turbomachine for ventilation and/or air supply, to ensure the proper operation of the turbine engine.

The flange equipped with the circular bleed ports is therefore integral with the outer shell, itself secured to the head of the stator vanes. By way of example, to keep the stator vanes extending radially inward from the outer shell, the latter usually comprising a plurality of openings spaced circumferentially one from another, and made to pass through, i.e. each made in the thickness of the ferrule, generally metallic. Each hole houses the head of one of the stator vanes, this head being fixed to the outer shell by means of a solder made in said hole, extending continuously all around the head of the vane. A similar attachment may be provided between the foot of the stator vanes and the inner ferrule of the rectifier.

Another possible design lies in the manufacture of each rectifier sector in one piece, for example by lost-wax casting.

Whatever the design chosen, there is a risk of premature appearance of cracks at the trailing edge of the vane heads. The explanation of this phenomenon, which is detrimental to the life of the stator vanes, lies in the presence of very high static/dynamic loads at the trailing edge of the vane head, which translate into a dynamic margin that is too weak, making the appearance of cracks more likely.

To overcome this drawback, it has been proposed to thicken the outer shell so as to limit deformations during operation, and thus reduce the stresses applied to the trailing edges of the vane heads. Nevertheless, this solution is extremely unfavourable in terms of cost and mass.

It has also been proposed to thicken the vanes, but this inevitably leads to a disturbance of the air flow therethrough, with a consequent negative impact on the overall performance of the turbomachine.

In the document FR 2 945 331, it has also been proposed to associate each hole housing a vane head with a mechanical deloading slot made through the outer ferrule. The slot has for example a general shape of U or V, similar to a horseshoe shape, which allows it to release from the dynamic margin and thus to delay the appearance of cracks. In this solution, during the deformation of the outer shell during operation, the heavily loaded zone is offset at the ends of the deloading slot, i.e. away from the trailing edge, even within the outer shell which is largely able to support this load. However, the presence of these mechanical deloading slots generates aerodynamic disturbances of the primary flow through the rectifier.

There remains a need to optimize the design of the compressor rectifiers, so as to limit aerodynamic disturbances on the primary jet, while reducing the risk of occurrence of cracks on the heads of the stator vanes.

SUMMARY OF THE INVENTION

To at least partially meet this need, the subject of the invention is a rectifier for an aircraft turbomachine compressor, said rectifier comprising an inner ferrule, an outer ferrule and stator vanes integral with the inner and outer ferrules, said stator further comprising a flange integral with a downstream end of the outer shell and intended to be fixed on a compressor housing, said flange being provided with air bleed holes spaced from each other in a circumferential direction of the rectifier. According to the invention, at least one of the air bleed ports is circumferentially oblong.

The invention advantageously provides for associating, with at least one air bleed port, an additional function of mechanical unloading of the stator vanes. Indeed, due to the circumferentially extending shape thereof, the bleed port makes it possibly to substantially deload the trailing edge of the vane head located radially opposite said port. In addition, since these bleed ports are located on the flange outside the primary jet, and no longer on the outer shell defining the same jet as in the prior art, the primary flow is not disturbed by the presence of these means of mechanical deloading.

In addition, using existing ports simplifies and speeds up the manufacturing process. In this respect, it is indicated that by replacing one or more existing circular ports by a circumferentially oblong port, it is possible to maintain the same opening area and therefore the same bleed rate. In addition, with the invention, it is perfectly possible to maintain the existing radial position of the bleed ports, conducive to a satisfactory flow of air therethrough. As will be detailed below, the bleed ports are placed radially outward facing the most mechanically loaded vanes.

The invention furthermore provides at least one of the following additional features, taken alone or in combination.

Said at least one bleed port has an oblong or generally rectangular shape.

Said at least one bleed port has a circumferential dimension Dc and a radial dimension Dr, and the ratio between the dimensions Dc and Dr is between 1.5 and 4.

The flange is equipped with circumferentially oblong bleed ports, as well as circular bleed ports. Alternatively, all the ports could be circumferentially oblong, removing all the circular ports.

The invention also relates to a rectifier sector for an aircraft turbomachine compressor, said rectifier sector comprising an inner ferrule sector, an outer ferrule sector as well as stator vanes integral with the inner and outer ferrule sectors, said rectifier further comprising a flange sector secured to a downstream end of the outer shell sector and for attachment to a compressor housing, said flange sector being provided with at least one air bleed port. According to the invention, said air bleed orifice is arranged centrally on the flange sector circumferentially along the rectifier sector, and has a circumferentially oblong shape. This makes it possible to mechanically deload the central vane from the stator sector, which is one of the most statically/dynamically loaded. In this case, the flange sector may optionally be equipped with at least one other air bleed port, circular in shape or circumferentially oblong.

The other two most loaded vanes are those arranged at the circumferential ends of the rectifier sector. Thus, the invention also relates to a rectifier sector for an aircraft turbomachine compressor, said rectifier sector comprising an inner ferrule sector, an outer ferrule sector as well as stator vanes integral with the inner and external ferrule sectors, said rectifier further comprising a flange sector integral with a downstream end of the outer ferrule sector and intended to be fixed on a compressor housing. According to the invention, said flange sector has a first circumferential end and a second circumferential end opposite the first, said first end having a first portion of an air bleed port and said second end having a second portion of another air bleed port, the first and second port portions being each open outwardly in a circumferential direction of the rectifier sector, and the sum of the circumferential dimensions $Dc_1$, $Dc_2$ of the first and second portions of the ports is greater than the radial dimension Dr of each of these. Consequently, when two rectifier sectors are arranged end-to-end, a circumferentially oblong bleed port is formed at their junction, which makes it possible to deload the two end vanes arranged opposite each other.

Optionally, said flange sector is also equipped with an air bleed port arranged centrally and circumferentially, and having a circumferentially oblong shape so as to deload the central vane of the rectifier sector. Alternatively or simultaneously, one or more circular air bleed ports could be made through the flange sector, between said first and second portions of ports provided at the ends of said sector.

The invention also relates to an assembly comprising a first rectifier sector and a second rectifier sector each having the design described above, the first and second rectifier sectors being arranged end-to-end so the second circumferential end of the first rectifier sector is juxtaposed to the first circumferential end of the second rectifier sector, and so that said air bleed port formed jointly by the second orifice portion of the first rectifier sector and the first orifice portion of the second rectifier sector, has a circumferentially oblong shape. As indicated above, this makes it possible to mechanically deload the two end vanes arranged facing each other, at the junction between the two rectifier sectors.

The assembly is preferably designed so that said bleed port is circumferentially cantered with respect to a pair of end trailing edges formed on the one hand by means of a trailing edge of the stator vane at the second circumferential end of the first rectifier sector, and secondly with a trailing edge of the stator vane at the first circumferential end of the second rectifier sector. To arrive at such an arrangement when the two trailing edges at the end of the same sector are not arranged symmetrically with respect to a median plane of this sector, the first and second portions of ports preferably have different circumferential dimensions $Dc_1$, $Dc_2$. Alternatively, these dimensions $Dc_1$ and $Dc_2$ may be identical, without departing from the scope of the invention.

Finally, the subject of the invention is an aircraft turbomachine comprising a compressor equipped with at least one such rectifier, or at least one such rectifier sector, or at least one such set of two rectifier sectors.

Other advantages and features of the invention will become apparent in the detailed non-limiting description hereinafter.

BRIEF DESCRIPTION OF THE DRAWINGS

This description will be made with reference to the appended drawings among which.

DETAILED DISCLOSURE OF THE PREFERRED EMBODIMENTS

Figure 1:
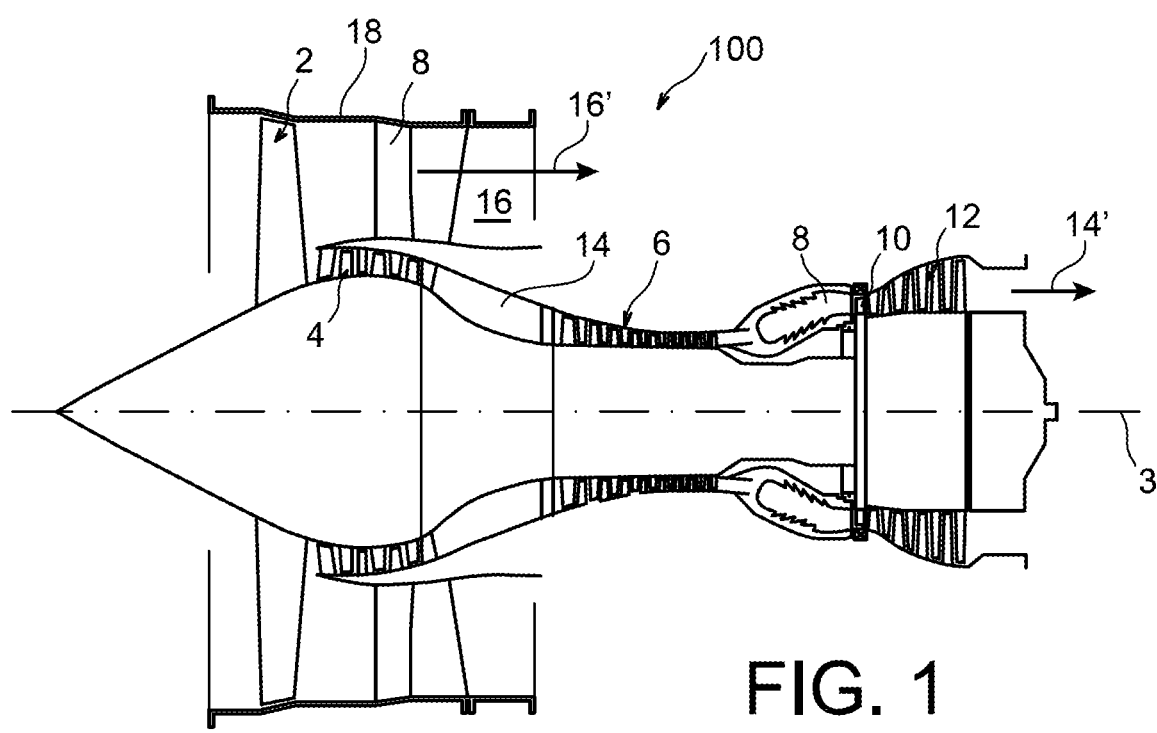
FIG. 1 shows a longitudinal sectional view of an aircraft turbomachine according to the invention.

Referring firstly to FIG. 1, an aircraft turbomachine 100 is shown on which the invention is to be integrated. This is a turbojet engine with double flow and double body. Nevertheless, it could be a turbomachine of another type, for example a turboprop, without departing from the scope of the invention.

The turbomachine 1 has a longitudinal axis 3 around which its various components extend. It comprises, from upstream to downstream in a main direction of gas flow through said turbomachine, a fan 2, a low pressure compressor 4, a high pressure compressor 6, a combustion chamber 8, a high-pressure turbine 10 and a low-pressure turbine 12. These elements define a primary jet 14 crossed by a primary stream 14', while a secondary jet 16 surrounds the primary jet being partially defined by a fan casing 18 and traversed by a stream of air secondary 16'.

Figure 2:
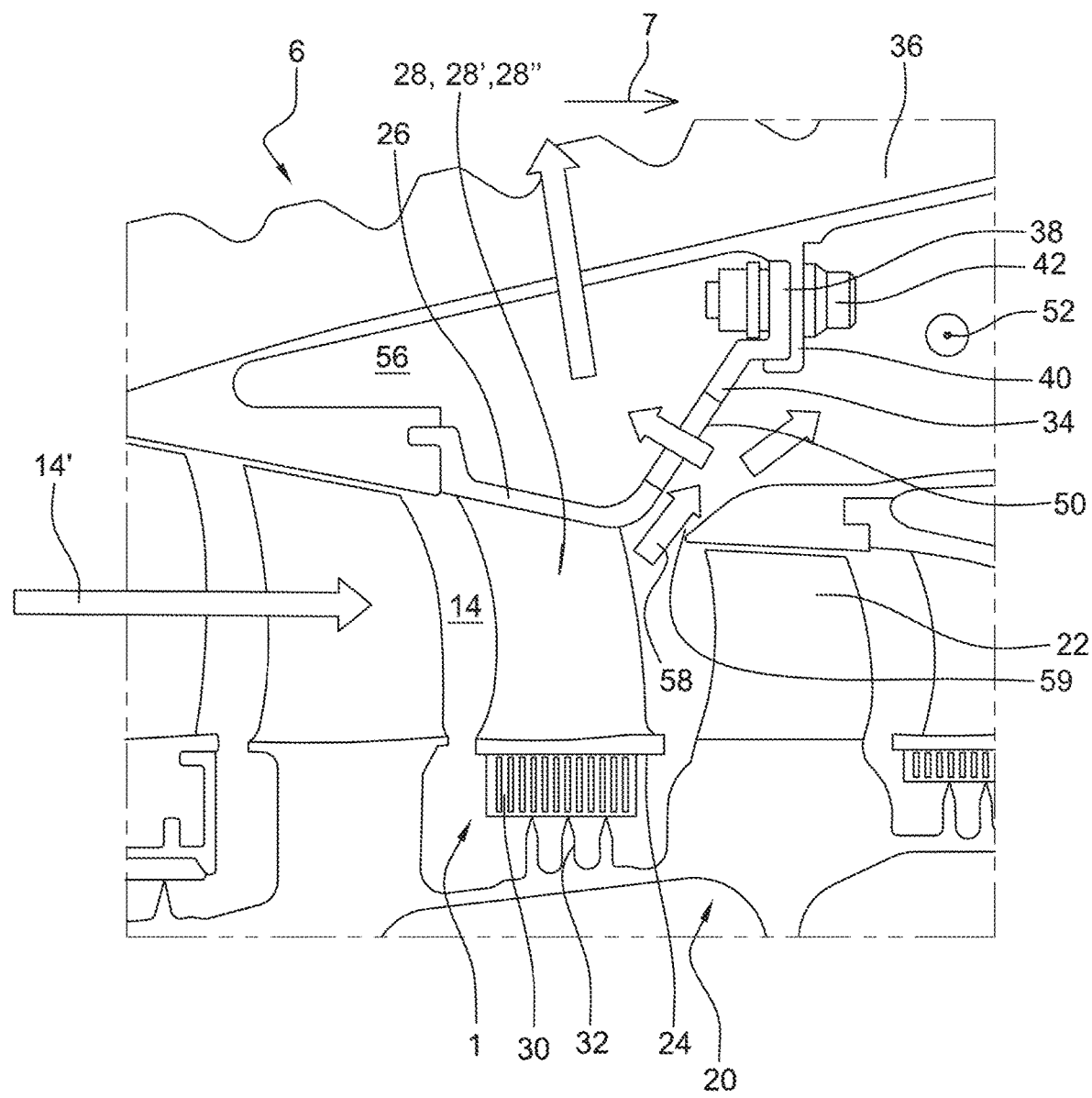
FIG. 2 shows a partial longitudinal sectional view of the high pressure compressor equipping the turbomachine shown in the previous figure.

FIG. 2 shows a part of the high-pressure compressor 6, and in particular the third stage thereof formed by a rectifier 1 according to the invention, as well as by a mobile wheel 20 carrying rotor vanes 22. The mobile wheel 20 is located downstream of the rectifier 1, with respect to a main direction 7 of flow of the primary flow 14' through the rectifier.

The rectifier 1 comprises an inner ferrule 24 and an outer ferrule 26, both cantered on the axis 3. In this respect, it is noted that the terms "inside" and "outside" are to be considered in a conventional manner, that is to say with respect to the axis 3. The rectifier also comprises stator vanes 28, 28', 28" distributed circumferentially and secured to the ferrules 24, 26. Also conventionally, each vane blade has a lower face and an extrados face, and a leading edge upstream and a trailing edge downstream. More specifically, the foot of each vane 28, 28', 28" is integral with the inner ferrule 24, while the head is integral with the outer ferrule 26. It is preferably a single piece obtained by casting, for example by lost-wax casting.

The inner ferrule 24 internally carries an abradable coating 30 engaging with wipers 32 rigidly connected in rotation with the mobile wheel 20. The wipers 32 and the abradable coating 30 together form, in a conventional manner, a labyrinth seal.

The rectifier 1 further comprises a flange 34 for attachment thereof to a compressor housing 36. The flange 34 is integral with a downstream end of the outer ferrule 26, for example made in one piece with said ferrule. At the outer radial end thereof, the flange 34 has a plate 38 for fixing same by bolts 42 to a plate 40 secured to the compressor casing 36. The bolts 42 thus pass through the fixing holes made through the plates 38, 40, same being oriented substantially transversely. The central portion of the flange 34 is oriented in an inclined manner with respect to the axial and radial directions of the turbomachine. It is also equipped with air bleed ports 50, spaced from each other in a circumferential direction 52 of the rectifier 1. In this case, the bleed ports 50 open access to an annular cavity 56 defined by the outer shell 26, the compressor casing 36 and the flange 34. It is noted that unlike the outer ferrule 26, the flange 34 does not participate in the definition of the primary jet 14.

In operation, a low air flow 58 escapes from the primary jet 14 while passing through the axial clearance 59 between the rectifier and the mobile wheel directly downstream. Then, the air flow taken can circulate through the bleed ports 50 of the flange, then join other elements of the turbomachine for ventilation and/or air supply, to ensure the proper operation of the turbomachine.

As will be detailed below, one of the peculiarities of the invention lies in the oblong shape of all or part of the bleed ports 50, in the circumferential direction 52.

Figure 3:
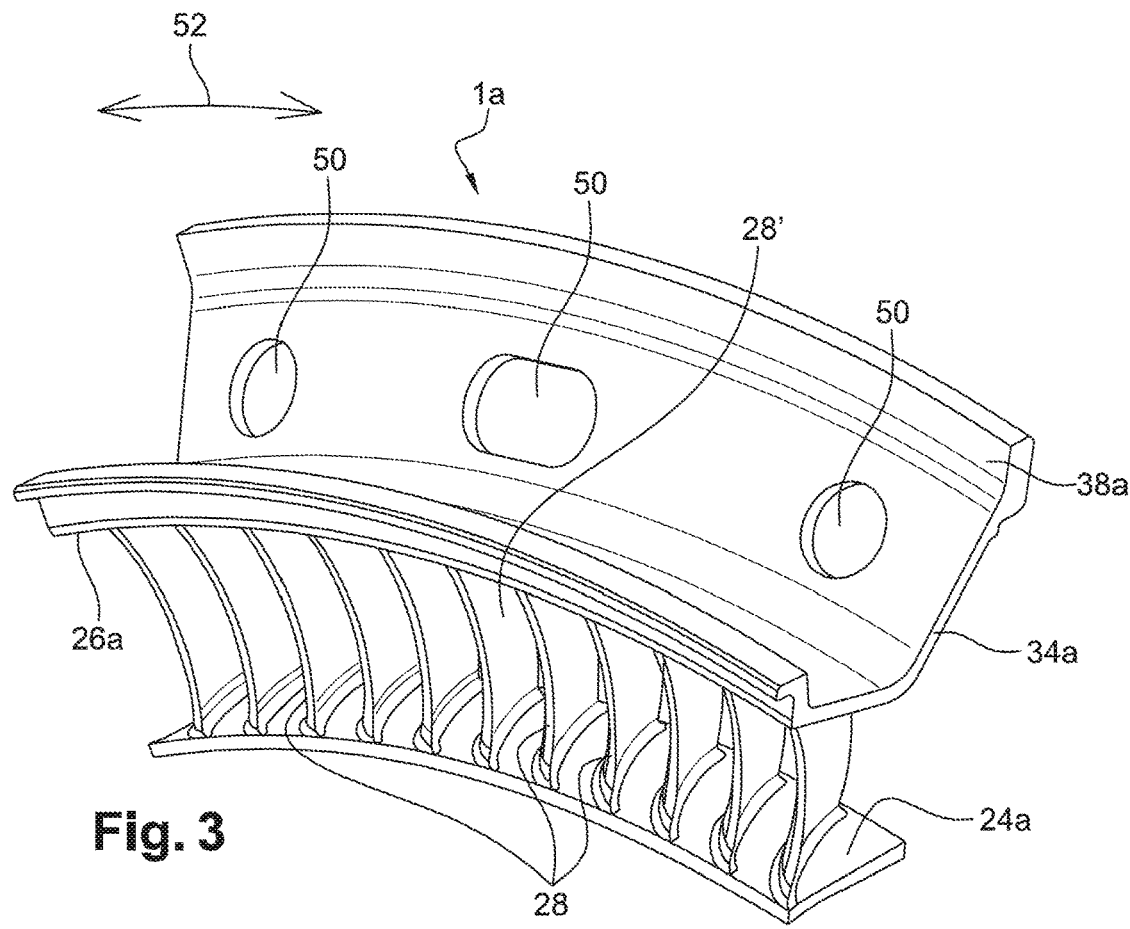
FIG. 3 is a perspective view of a rectifier sector for forming a portion of a rectifier of the high pressure compressor shown in the preceding figure, the sector being in the form of a first preferred embodiment.
Figure 4:
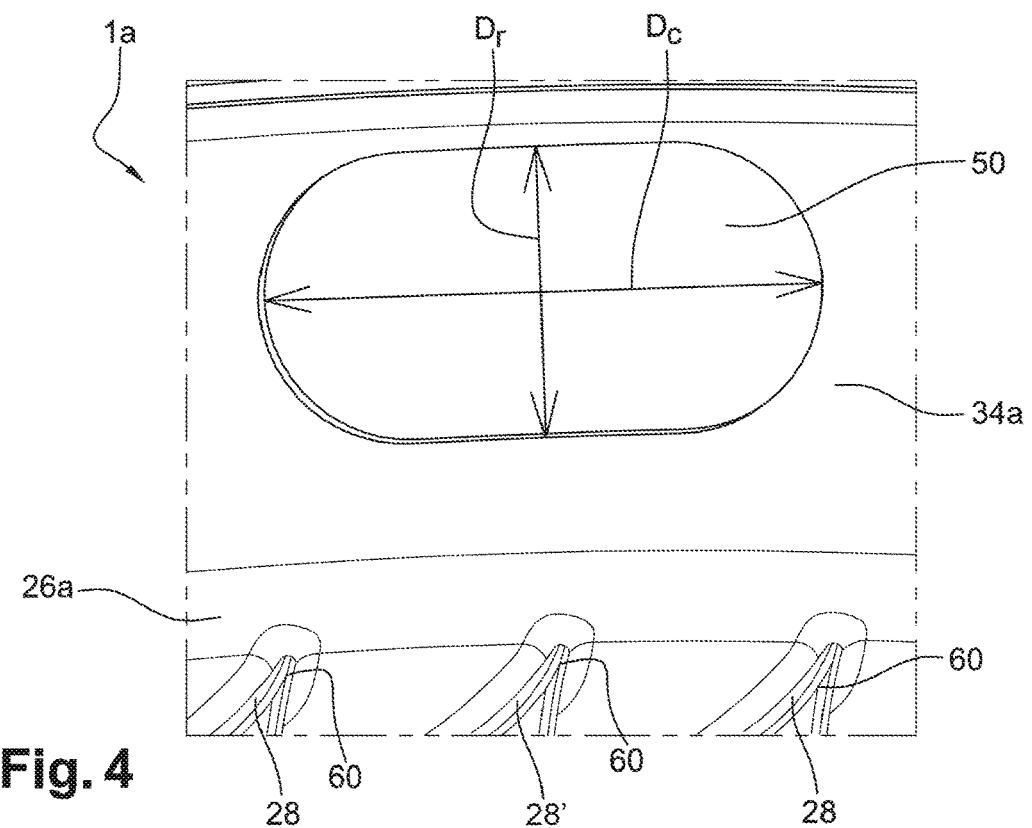
FIG. 4 is a partial front view of the rectifier sector shown in the previous figure.

FIGS. 3 and 4 show a rectifier sector 1a according to a first preferred embodiment of the invention. This sector 1a is intended to form an angular or circumferential portion of the rectifier 1. In other words, the rectifier 1 is intended to be formed by the end-to-end assembly of several sectors 1a of the type that will be presently described, and each of which is preferably made in one piece by casting, for example by lost-wax casting.

The sector 1a comprises an inner ferrule sector 24a and an outer ferrule sector 26a, both cantered on the axis 3. It also comprises stator vanes 28, 28', 28" distributed circumferentially and secured to the ferrules 24a, 26a, for example, between five and twenty of these vanes being provided.

The rectifier sector 1a further comprises a flange sector 34a for fixing it to a compressor housing. The flange sector 34a is secured to a downstream end of the outer ferrule sector 26a, having a fastening plate sector 38a at the outer radial end thereof. Although not shown, the plate sector 38a serves for bolt fixing of the rectifier sector 1a on to the compressor housing.

The central portion of the flange sector 34 is equipped with air bleed ports 50, for example three ports spaced apart from one another in the circumferential direction 52 of the rectifier 1.

The two ports 50 located near the ends of the rectifier sector 1a are for example of conventional circular shape. On the other hand, the bleed port 50 cantered on the flange sector in the circumferential direction 52 has an oblong shape along this same direction. By oblong shape, it is understood that the air bleed port 50 has a circumferential dimension Dc which is greater than its radial dimension. The ratio between the dimensions Dc and Dr can be between 1.5 and 4, for example, so as to have an oblong shape, or generally rectangular shape with rounded corners.

The central bleed port 50 is more precisely cantered with respect to a trailing edge 60 of the central vane of the sector 1a, referenced 28'. In other words, this port 50 extends on either side of the trailing edge 60 along a circumferential half-dimension Dc/2. By trailing edge, it is understood the portion of the trailing edge located at the top of the blade of the vane, at the junction with the outer ferrule 26a. This arrangement makes it possible to satisfactorily deload this central blade 28', which is one of the most mechanically loaded during operation. This way of deloading the vane 28' is advantageous in that it makes it possible to maintain an identical section of air bleed by replacing two or more circular bleed ports in a single port 50, oblong circumferentially. It is also advantageous in that it does not disturb the flow of the primary stream 14' in the jet 14, and in that the radial positioning of the ports 50 can be retained relative to the existing one.

Figure 5:
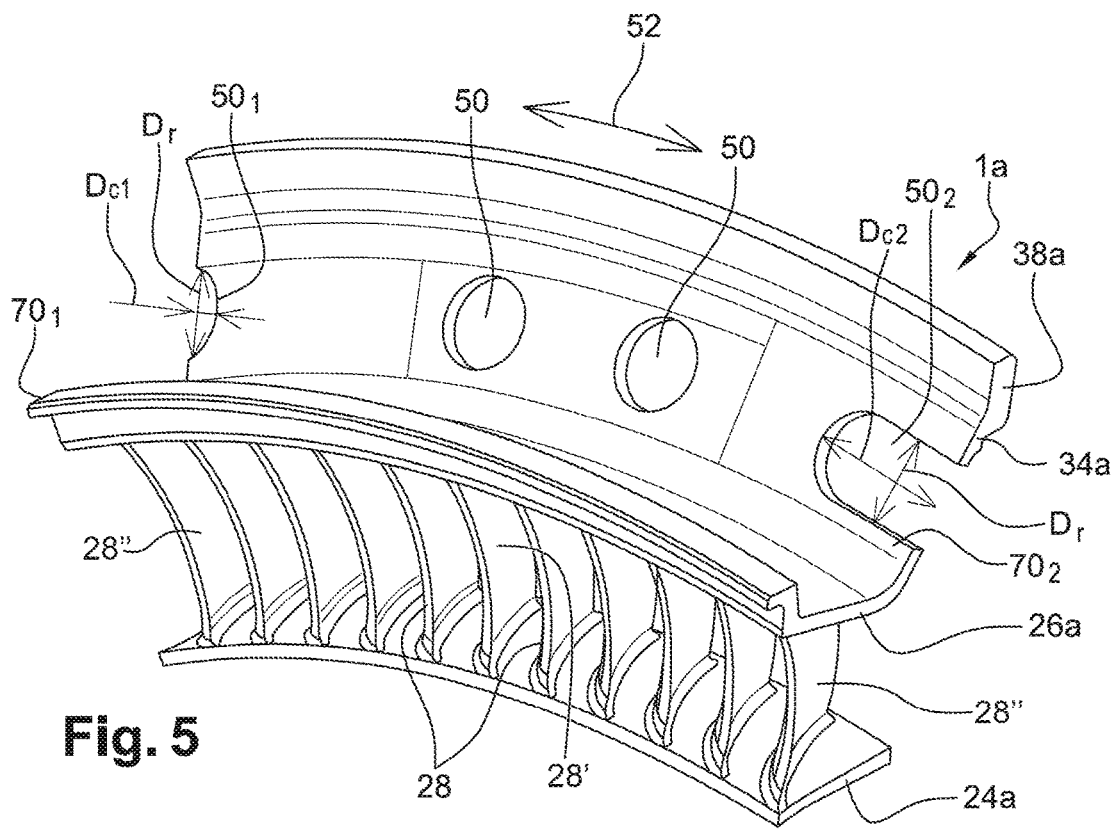
FIG. 5 is a view similar to that of FIG. 3, with the rectifier sector being in the form of a second preferred embodiment.

According to a second embodiment shown in FIG. 5, the flange sector 1a comprises a first circumferential end $70_1$ as well as a second circumferential end $70_2$ opposite the first end in the circumferential direction 52. The first end $70_1$ comprises a first portion $50_1$ of an air bleed port, and the second end $70_2$ has a second portion $50_2$ of another bleed port. These two portions $50_1$, $50_2$ are each open outwardly in the circumferential direction 52. They respectively have circumferential dimensions $Dc_1$, $Dc_2$ whose sum is greater than the radial dimension Dr of each of them. It is noted that the ratio between the sum of the circumferential dimensions $Dc_1$ and $Dc_2$, and the dimension $D_r$, is preferably between 1.5 and 4.

In the present case, the two circumferential dimensions $Dc_1$, $Dc_2$ are different, the second being higher than the first.

The rectifier sector 1a in this case can also include two circular air bleed ports 50.

Figure 6:
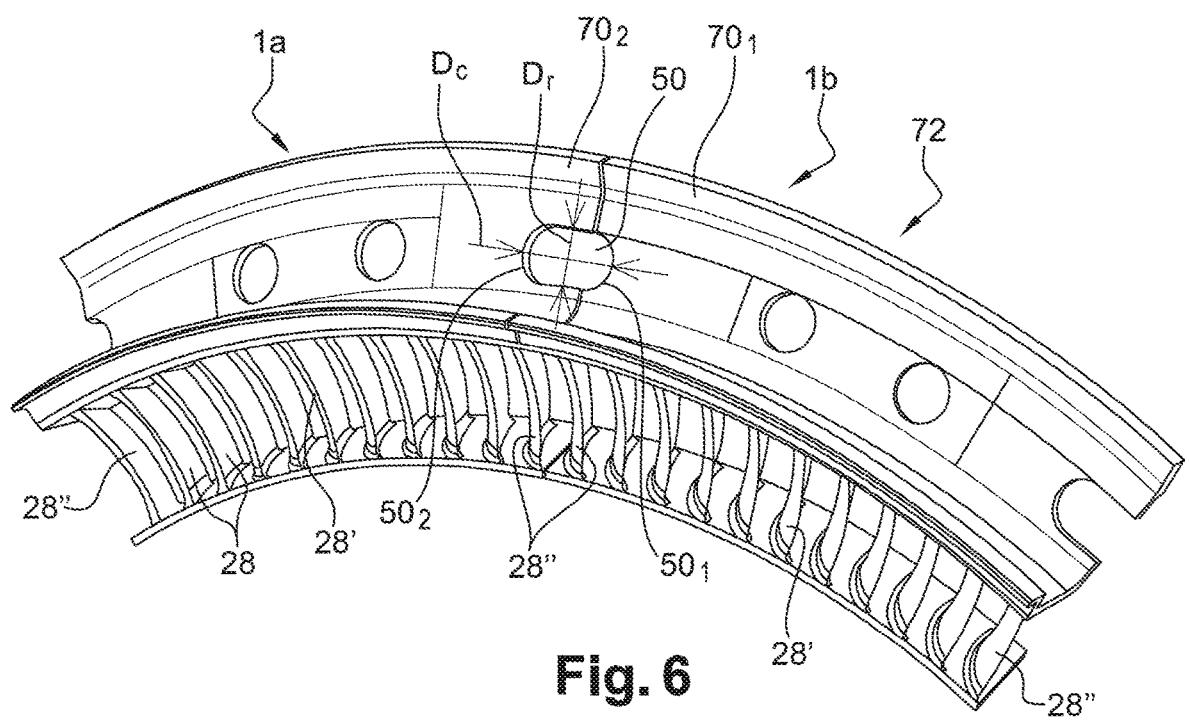
FIG. 6 shows a set of two rectifier sectors of the type of that shown in FIG. 5, arranged end-to-end.

FIG. 6 shows an assembly 72 corresponding to the assembly of a first rectifier sector 1a arranged end-to-end with a second rectifier sector, referenced 1b and having a design identical or similar to that of the first sector 1a. In this regard, it is noted that the opposite ends $70_1$, $70_2$ are juxtaposed, also called adjacent, but they are preferably not fixed directly to one another. Indeed, the attachment of the two sectors 1a, 1b is effected on the same casing, which allows obtaining an indirect attachment between these opposite ends.

Once assembled, it forms at the junction between the two sectors 1a, 1b an air bleed port 50 of circumferentially oblong form. This port 50 is formed jointly by the second portion $50_2$ of the first sector 1a and by the first portion $50_1$ of the second sector 1b, these two portions being of complementary shape. The port 50 then has a circumferential dimension Dc corresponding to the sum of the circumferential dimensions $Dc_1$, $Dc_2$, as well as a radial dimension $D_r$.

Figure 7:
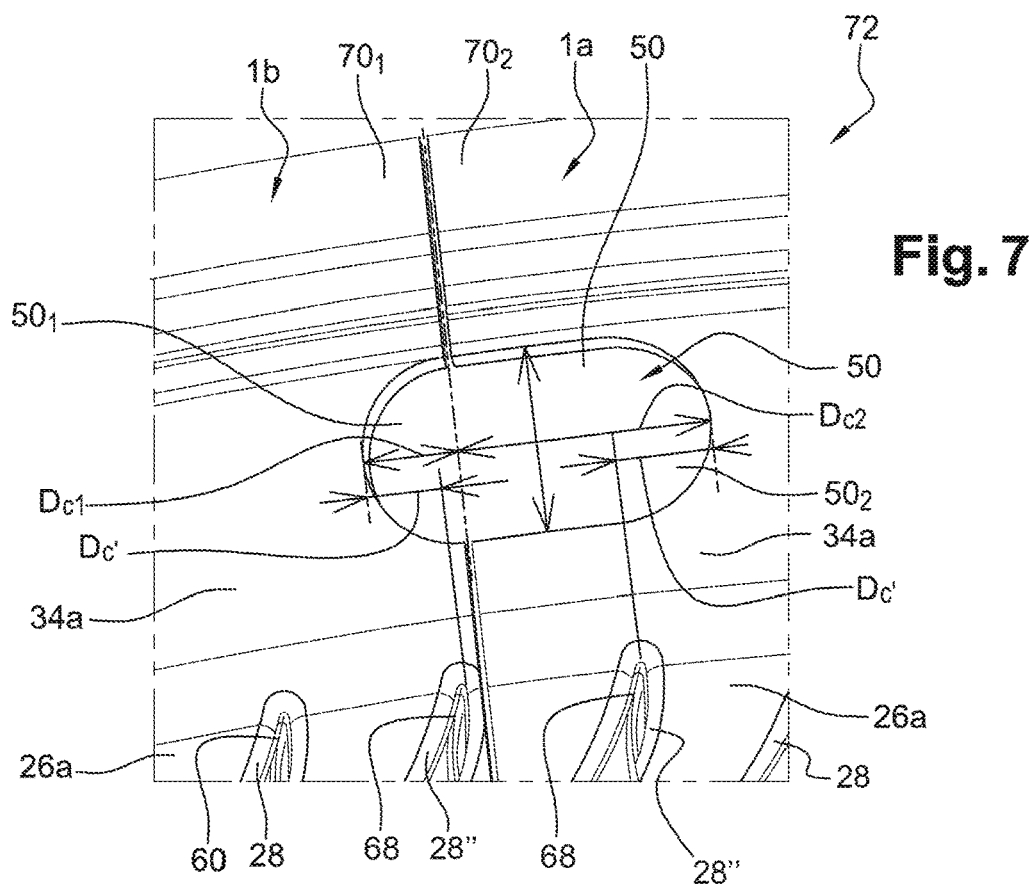
FIG. 7 shows an enlarged rear view of the junction between the two rectifier sectors shown in the previous figure.

The assembly 72 is designed such that the recomposed air bleed port 50 is cantered in the circumferential direction 52 with respect to a pair of end trailing edges 68. This pair, shown in FIG. 7, is formed on the one hand using a trailing edge 68 of the stator vane 28" located at the second circumferential end $70_2$ of the first rectifier sector 1a, and secondly using a trailing edge 68 of the stator vane 28" located at the first circumferential end $70_1$ of the second sector 1b.

The bleed port 50, located radially opposite this pair of trailing edges 68, thus extends circumferentially on either side of this pair along two substantially identical circumferential dimensions Dc'. This makes it possible to deload satisfactorily the two end vanes 28", which are also very mechanically loaded.

Figure 8:
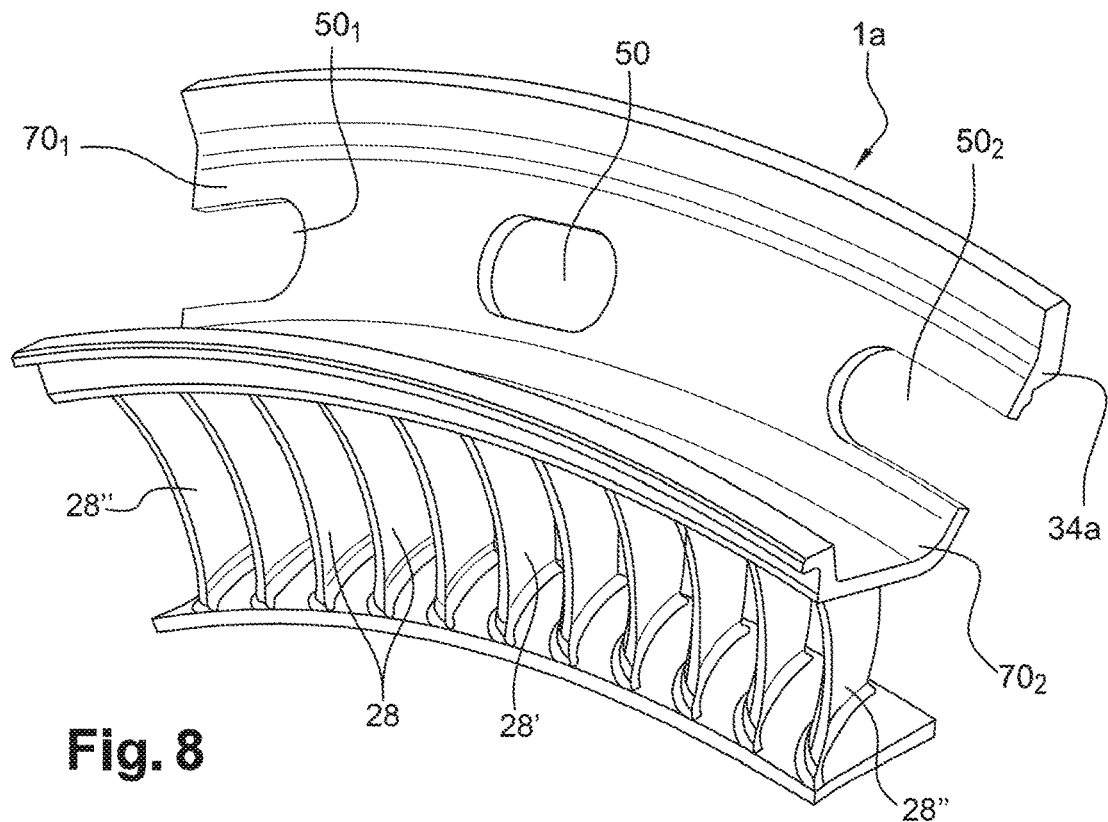
FIG. 8 is a view similar to that of FIG. 3, with the rectifier sector being in the form of a third preferred embodiment.

Finally, the rectifier sector 1a shown in FIG. 8 corresponds to a third embodiment, combining the first and second embodiments. It therefore comprises a circumferentially oblong central bleed port 50, to which is added a first portion $50_1$ of an air bleed port made on the first end $70_1$, and a second portion $50_2$ of another air bleed port provided on the second end $70_2$. In this third embodiment, the portions $50_1$, $50_2$ may be of the same or different circumferential lengths.

Of course, various modifications may be made by those skilled in the art to the invention which has just been described, solely as non-limiting examples.

What is claimed is:

1. A rectifier for an aircraft turbomachine compressor, said rectifier comprising an inner ferrule, an outer ferrule and stator vanes rigidly connected to the inner and outer ferrules said rectifier further comprising a flange rigidly connected to a downstream end of the outer ferrule and for attachment to a compressor casing, said flange being provided with air intake ports spaced from each other in a circumferential direction of the rectifier, wherein said flange is outwardly protruding from said outer ferrule and said air intake ports are arranged through said flange at a location radially outside of said outer ferrule, and
    wherein at least one of the air intake ports has a shape stretched in the circumferential direction, and
    wherein both an inlet and an outlet of the air intake ports are outside a primary jet.

2. The rectifier according to the claim 1, wherein said at least one intake port has an oblong or generally rectangular shape.

3. The rectifier according to claim 1, wherein said at least one intake port has a circumferential dimension Dc and a radial dimension Dr, and in that the ratio between the dimensions Dc and Dr is between 1.5 and 4.

4. The rectifier according to claim 1, wherein the flange is provided with intake ports that are oblong in the circumferential direction, as well as circular intake ports.

5. A rectifier sector for an aircraft turbomachine compressor, said rectifier sector having an inner ferrule sector, an outer ferrule sector as well as stator vanes rigidly connected to the inner and outer ferrule sectors, said rectifier sector further comprising a flange sector rigidly connected to a downstream end of the outer ferrule sector and intended to be attached to a compressor housing, said flange sector being provided with at least one air intake port,
    wherein said air intake port is centrally disposed on the flange sector in a circumferential direction of the rectifier sector, and has a shape oblong along said circumferential direction, and
    wherein both an inlet and an outlet of said air intake port are outside a primary jet.

6. The rectifier sector according to claim 5, wherein the flange sector is also equipped with at least one circular air intake port.

7. A rectifier sector for an aircraft turbomachine compressor, said rectifier sector having an inner ferrule sector, an outer ferrule sector as well as stator vanes rigidly connected to the inner and outer ferrule sectors, said rectifier sector further comprising a flange sector rigidly connected to a downstream end of the outer ferrule sector and intended to be attached to a compressor housing,
    wherein said flange sector has a first circumferential end and a second circumferential end opposite the first end, said first end having a first portion of an air intake port and said second end having a second portion of another air intake port, the first and second port portions each being open outwardly in a circumferential direction of the rectifier sector, and in that the sum of the circumferential dimensions $Dc_1$, $Dc_2$ of the first and second portions of the ports is greater than the radial dimension Dr of each of them, and
    wherein both an inlet and an outlet of the air intake port are outside a primary jet.

8. The rectifier sector according to claim 7, wherein said flange sector is also equipped with an air intake port arranged centrally in the circumferential direction and having an oblong shape in the circumferential direction, or in that said flange sector is also equipped with one or more circular air bleed ports.

9. An assembly comprising a first rectifier sector and a second rectifier sector each of which according to claim 7, the first and second rectifier sectors being arranged end-to-end so that the second circumferential end of the first rectifier sector is juxtaposed with the first circumferential end of the second rectifier sector, and in that said air intake port jointly formed by the second port portion of the first rectifier sector and the first port portion of the second rectifier sector has an oblong shape in the circumferential direction, the assembly being designed so that said intake port is centred in the circumferential direction with respect to a pair of end trailing edges formed by a trailing edge of the stator vane located at the second circumferential end of the first rectifier sector, and by a trailing edge of the stator vane located at the first circumferential end of the second rectifier sector.

10. An aircraft turbomachine comprising a compressor equipped with at least one rectifier according to claim 1.

11. An aircraft turbomachine comprising a compressor equipped with at least one rectifier sector according claim 4.

12. An aircraft turbomachine comprising a compressor equipped with at least one rectifier sector according to claim 6.

13. An aircraft turbomachine comprising a compressor equipped with at least one assembly according to claim 9.

14. The rectifier sector according to claim 5, wherein said air intake port is arranged through said flange sector at a location radially outside of said outer ferrule sector.

15. The rectifier sector according to claim 7, wherein said first portion of an air intake port and said second portion of another air intake port are arranged through said flange sector at a location radially outside of said outer ferrule sector.

* * * * *